Nov. 7, 1950    E. E. SCHENKEL    2,528,668
FILM CLIP
Filed April 18, 1949
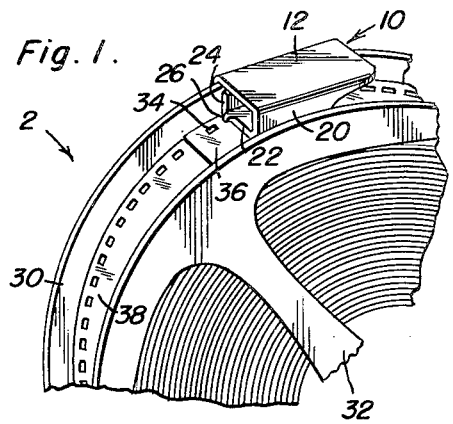
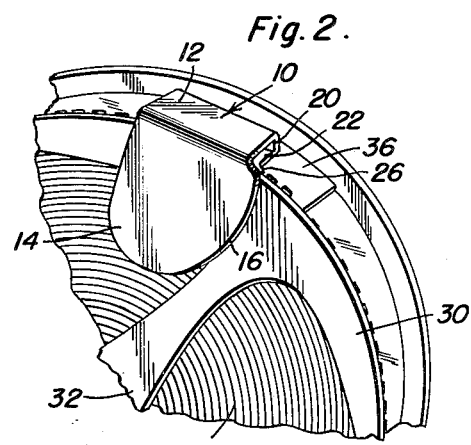
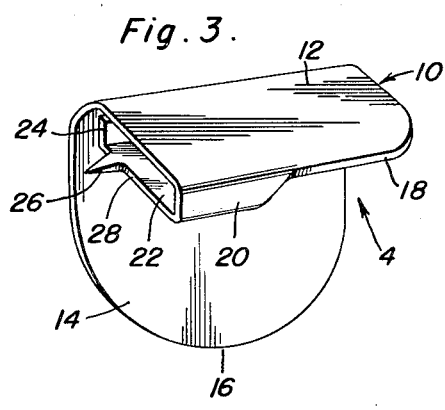
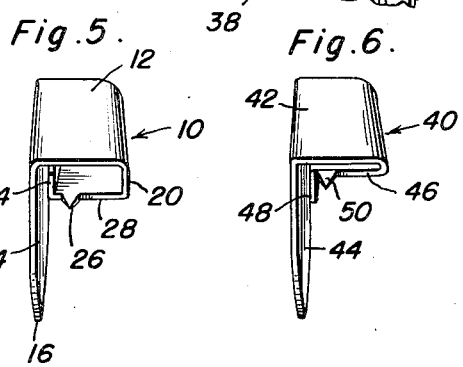
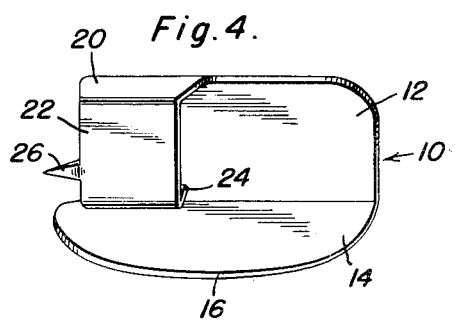
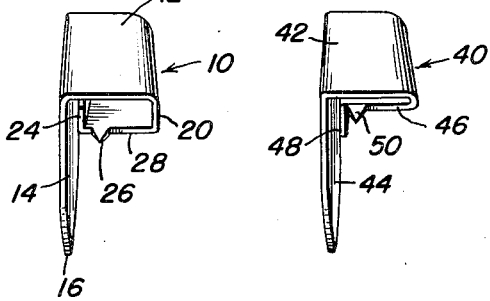
Inventor
Elmer E. Schenkel
By Clarence A. O'Brien
and Harvey B. Jackson
Attorneys Patented Nov. 7, 1950

2,528,668

UNITED STATES PATENT OFFICE 2,528,668

FILM CLIP

Elmer E. Schenkel, Casper, Wyo.

Application April 18, 1949, Serial No. 88,135

5 Claims. (Cl. 206—53)

This invention relates to new and useful improvements in film retainers and the primary object of the present invention is to provide a clip for film reels that will prevent film on a reel from unwinding.

Another very important object of the present invention is to provide a film clip that is quickly and readily applied to or removed from a film reel in a convenient manner and which will retain the free end of a film in position for access.

A further object of the present invention is to provide a film clip that is extremely small and compact in structure and embodying a novel and improved means for engaging a selected perforation in a film.

A still further aim of the present invention is to provide a film clip that is simple and practical in construction, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary perspective view of a film reel and showing the present invention applied thereon and engaging the free end of a film;

Figure 2 is a further perspective view taken substantially in the direction of arrow numbered 2 in Figure 1;

Figure 3 is a perspective view of the present film clip per se;

Figure 4 is a bottom perspective view taken substantially in the direction of arrow numbered 4 in Figure 3;

Figure 5 is an end perspective view of the present film clip; and

Figure 6 is an end perspective view of the present film clip in slightly modified form.

Referring now to the drawings in detail, wherein for the purpose of illustration, there is disclosed a preferred embodiment of the present invention, the numeral 10 represents the instant film clip generally. The clip 10 is constructed from a single blank of resilient material and includes a substantially L-shaped member having first and second leg portions 12 and 14.

The first leg portion 12 is substantially rectangular in configuration whereas the second leg portion 14 includes a convexed or arcuate edge 16.

Depending from the outer edge 18 of the leg portion 12, is a strip or flange 20 that terminates in an abutment 22 having an upstanding flange, arm or jaw 24 at one end that is spaced parallel to the second leg portion 14 of the L-shaped member.

It may be considered that a channel member is formed by the elements 20, 22 and 24, with the abutment 22 constituting the web portion of this channel member and the flanges 20 and 24 the leg portions of the channel member.

A pointed lug or prong 26 projects outwardly from one edge, 28, of the abutment 22. The lower face of the lug 26 is flush with the lower surface of the abutment 22 and the lug 26 is disposed relatively close to the jaw 24.

In practical use of the present invention, one flange 30 of a film reel 32 is placed between the jaw 24 and the leg portion 14, constituting a further jaw. Due to the resilient qualities of the clip 10 the same will be yieldingly retained on the flange 30.

The lug 26 is then inserted in a selected one of the perforations 34 in the free end 36 of the film 38 and will prevent the film from unwinding.

Figure 6 shows the present clip in slightly modified form. In this embodiment, the clip is designated generally by the numeral 40 and includes a channel-shaped member having leg portions or flanges 42 and 46.

A first elongated jaw or flange 44 is integrally formed with the leg portion 42 and is spaced parallel to a flange, arm or jaw 48 that is turned down from the leg portion or flange 46.

A pointed lug or prong 50 projects outwardly from the leg portion 46 for positioning in a selected perforation in the film.

It will be noted, that the clip 40 is similar in all aspects to the clip 10 except the flange 48 is turned downwardly rather than upwardly and the abutment or leg portion 46 is disposed closer to the leg portion 42 than the abutment 28 is disposed with respect to the leg portion 12.

The present invention is applicable for any size film, such as 16 mm. or 8 mm., and is quickly and readily applied to or removed from the flange 30 in a convenient manner.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claims.

Having described the invention, what is claimed as new is:

1. A film clip comprising a substantially L-shaped member of resilient material having first and second leg portions, an abutment integrally formed with and underlying the first leg portion of said member, said abutment including an arm spaced from the second leg portion of said member, said arm and said second leg portion adapted to yieldingly grip a flange of a film reel, and means carried by said abutment for positioning in a selected perforation in a film.

2. A film clip comprising a substantially L-shaped member of resilient material having first and second leg portions, an abutment integrally formed with the first leg portion of said member and underlying the first leg portion of said member, said abutment including an arm spaced from the second leg portion of said member, said arm and said second leg portion adapted to yieldingly grip a flange of a film reel, and a lug fixed to said abutment and projecting outwardly from the abutment for positioning in a selected perforation in a film.

3. A film clip comprising a substantially L-shaped member of resilient material having first and second leg portions, an abutment integrally formed with and underlying the first leg portion of said member, said abutment including an arm spaced from the second leg portion of said member, said arm and said second leg portion adapted to yieldingly grip a flange of a film reel, and a lug fixed to said abutment and projecting outwardly from the abutment for positioning in a selected perforation in a film, said lug having a pointed extremity, said lug being disposed adjacent said arm.

4. A film clip constructed from a single blank of resilient material and comprising a substantially channel shaped member having first and second leg portions, a first jaw on the first leg portion of said member, a second jaw on the second leg portion of said member, said jaws being spaced from each other and adapted to yieldingly grip a flange of a film reel, and an outwardly projecting prong on the first leg portion of said member for positioning in a selected perforation in a film.

5. A film clip comprising a substantially L-shaped member of resilient material including first and second leg portions, a channel shaped member including a web portion for yieldingly bearing against a film and first and second flanges joined by the web portion, said channel shaped member underlying the first leg portion of said L-shaped member, the first flange of said channel shaped member being integrally formed with the first leg portion of said L-shaped member and the second flange of said channel shaped member being spaced parallel to the second leg portion of said L-shaped member, and a lug projecting from the web portion of said channel shaped member for reception in a selected perforation in a film.

ELMER E. SCHENKEL.

REFERENCES CITED

The following references are of record in the file of this patent:

UNITED STATES PATENTS

| Number | Name | Date |
|---|---|---|
| 1,430,805 | Gilmore | Oct. 3, 1927 |
| 1,672,214 | Hayden | June 5, 1928 |
| 1,933,659 | Curran | Nov. 7, 1933 |
| 2,151,536 | Sperry | Mar. 21, 1939 |
| 2,174,049 | Werner | Sept. 26, 1939 |
| 2,273,701 | Funke | Feb. 17, 1942 |